J. GEIST.
GRIPPER TONGS.
APPLICATION FILED JAN. 14, 1915.
1,144,356.
Patented June 29, 1915.
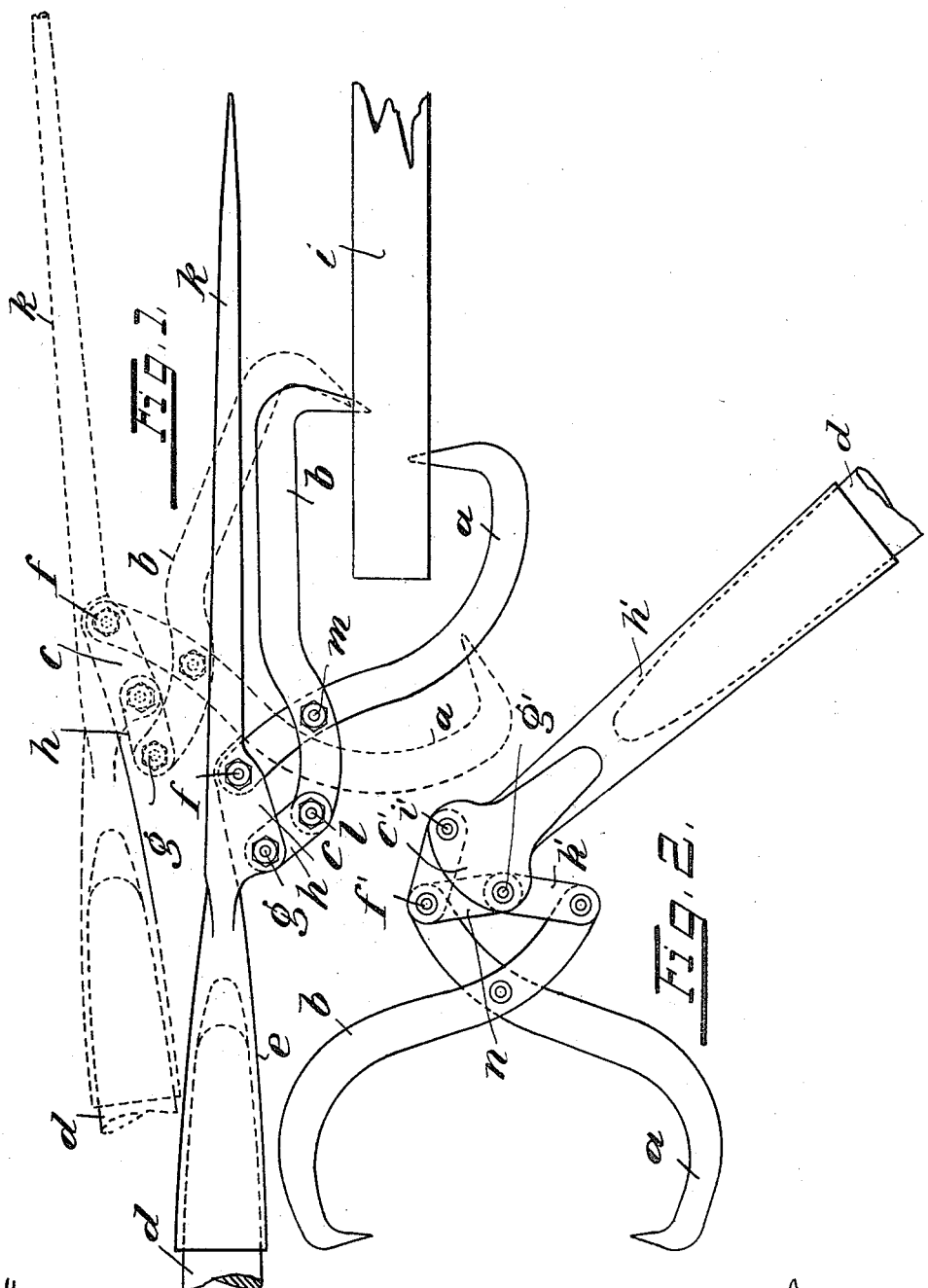
Witnesses:
D. T. Wentworth
Judith Pardee
Inventor
Josef Geist
by Otto Munx
his Attorney

UNITED STATES PATENT OFFICE.

JOSEF GEIST, OF KRAIBURG-ON-THE-INN, GERMANY.

GRIPPER-TONGS.

1,144,356.  Specification of Letters Patent.  Patented June 29, 1915.

Application filed January 14, 1915. Serial No. 2,131.

*To all whom it may concern:*

Be it known that I, JOSEF GEIST, a citizen of the German Empire, and residing at Kraiburg-on-the-Inn, Bavaria, German Empire, have invented certain new and useful Improvements in Gripper-Tongs, of which the following is a full, clear, and exact description.

The present invention relates to gripper-tongs for catching, pulling, carrying or lifting any kind of objects, as, for instance, beams, rails, sleepers, boards and for separating the wreckage of railway disasters, fires and the like, and consists of the details of construction as hereinafter set forth.

In order to render the invention more easily intelligible reference is had to the accompanying drawings, in which—

Figure 1 shows a gripping-tong in its operative position, while in dotted lines the inoperative i. e. open position of the said gripper tong is illustrated. Fig. 2 shows a modification.

In Fig. 1 $a$ and $b$ are the tong- or gripping-members, pivotally connected to each other at $m$.

$d$ is a handle, projecting into a socket $e$, having a pointed shaft or projection $k$ and also provided with a preferably slotted projection $c$, to which the tong- or gripper-members $a$ and $b$ are pivotally connected at $g$ and $f$, the member $b$ being connected to the projection $c$ by means of an intermediary link $h$, having the pivot $l$. The projection $c$ is arranged on the part $e$ in such a manner that the pivot $g$ is somewhat below the pivot $f$ so that the pivots $f$, $g$, $l$, $m$ form a joint-square, in which the members are nearly of the same length and in which the opposite members are nearly parallel to each other.

The gripper-tong is operated as follows:—
For gripping an object $i$ the gripper-tong is held in such a manner that the tong member $a$, directly connected to the stationary pivot $f$, falls down and swings the link $h$, and in turn the tong member $b$, pivoted to it, into the position, shown in Fig. 1 in dotted lines. Now the tong member $b$ is set upon the object to be gripped.

In order to close the tong members the handle is lowered into the position, shown in full lines in Fig. 1, or drawn rearwardly.

In the modified form of invention shown in Fig. 2, $d$ is the handle, projecting into the socket $h$. Projecting from one end of the socket $h'$ is the supporting member $c'$ carrying the oppositely disposed pivots $g'$ and $i'$. Movable about the pivot $g'$ is a double armed link, to the arm $k'$ of which the tong member $b$ is pivoted. The arm $n$ of the double armed link is pivotally connected at $f'$ to one end of the tong member $a$ and to one end of a link $m'$, the other end of which is mounted on the pivot $i'$. This form of the invention gives the tongs $a$ and $b$ a greater range of movement than in the form of Fig. 1, and adapts the device particularly for engaging and moving large round objects, such as trees and pipes.

I claim as my invention:—

In gripper tongs, the combination of a pair of pivotally interconnected tong members, one of said members normally projecting forwardly beyond the other, a handle, a pivot support extending beyond the plane of said handle and inclined in relation to the latter at an angle greater than a right angle, a pivot in said support to which the less forwardly projecting tong member is directly connected, a second pivot in said support below and to one side of said first named pivot, and a link having one of its ends connected to said second named pivot and its other end pivotally connected to the tong member projecting beyond the other.

In testimony whereof I affix my signature in the presence of two witnesses.

JOSEF GEIST.

Witnesses:
U. ROEDER,
ARTHUR GUBE.

Copies of this patent may be obtained for five cents each, by addressing the "Commissioner of Patents, Washington, D. C."